United States Patent
Pundak

(10) Patent No.: US 11,334,192 B1
(45) Date of Patent: May 17, 2022

(54) DUAL TOUCHSCREEN DEVICE CALIBRATION

(71) Applicant: Microsoft Technology Licensing, LLC, Redmond, WA (US)

(72) Inventor: Gilad Pundak, Rehovot (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/322,771

(22) Filed: May 17, 2021

(51) Int. Cl.
   *G06F 3/041* (2006.01)
   *G06F 3/14* (2006.01)
   *G06F 3/044* (2006.01)

(52) U.S. Cl.
   CPC .......... *G06F 3/0418* (2013.01); *G06F 3/0446* (2019.05); *G06F 3/1431* (2013.01); *G06F 2203/04104* (2013.01)

(58) Field of Classification Search
   CPC .... G06F 3/0418; G06F 3/0446; G06F 3/1431; G06F 2203/04104
   USPC ......................................................... 345/156
   See application file for complete search history.

(56) References Cited

U.S. PATENT DOCUMENTS

| | | | | |
|---|---|---|---|---|
| 8,531,474 | B2* | 9/2013 | Chang | H04N 9/69 345/589 |
| 10,209,835 | B2* | 2/2019 | Akai | G06F 3/0443 |
| 10,592,051 | B1 | 3/2020 | Yildiz et al. | |
| 10,649,713 | B1* | 5/2020 | Liu | G06F 3/1431 |
| 10,929,016 | B1 | 2/2021 | Liu et al. | |
| 2008/0170046 | A1* | 7/2008 | Rimon | G06F 3/0446 345/174 |
| 2009/0167782 | A1* | 7/2009 | Petljanski | G09G 5/003 345/601 |
| 2011/0199105 | A1* | 8/2011 | Otagaki | G06F 3/0446 324/679 |
| 2012/0050229 | A1* | 3/2012 | Tenuta | G06F 3/0445 345/178 |

(Continued)

OTHER PUBLICATIONS

"Calibrating and Profiling Dual Monitors on Mac OS X Systems", Retrieved from: https://web.archive.org/web/20160914141618/https:/www.xrite.com/service-support/calibrating_and_profiling_dual_monitors_on_mac_os_x_systems, Sep. 14, 2016, 2 Pages.

(Continued)

*Primary Examiner* — Tom V Sheng
(74) *Attorney, Agent, or Firm* — Alleman Hall Creasman & Tuttle LLP

(57) ABSTRACT

A computing device is provided. The computing device comprises a first display device having a first capacitive touch sensor having a first current calibration map. The computing device further comprises a second display device having a second capacitive touch sensor. The computing device further comprises a processor configured to perform a first run-time calibration on the first capacitive touch sensor to generate a first calculated calibration map. The processor is further configured to perform a second run-time calibration on the second capacitive touch sensor to generate a second calculated calibration map. The processor is further configured to detect a replacement condition for the first calculated calibration map and replace the first current calibration map with the second calculated calibration map, such that the second calculated calibration map is utilized for the first capacitive touch sensor of the first display device.

20 Claims, 8 Drawing Sheets

(56) References Cited

U.S. PATENT DOCUMENTS

2013/0278539 A1* 10/2013 Valentine .............. G06F 3/0418
340;345/174

OTHER PUBLICATIONS

Walrath, John., "Computer Requirements for Multiple Display Calibration", Retrieved from: https://www.datacolor.com/computer-requirements-multiple-display-calibration/, Mar. 15, 2017, 5 Pages.

Fang, et al., "Calibration in touch-screen systems", In Journal of Texas Instruments Incorporated, vol. 10, Aug. 2007, 6 Pages.

* cited by examiner

US 11,334,192 B1

DUAL TOUCHSCREEN DEVICE CALIBRATION

BACKGROUND

Devices having two touchscreens routinely perform run-time calibrations of the two touchscreens in order to ensure that touch inputs are accurately detected. However, technical challenges exist in performing valid run-time calibrations of both touchscreens.

SUMMARY

A computing device is provided. The computing device comprises a first display device having a first capacitive touch sensor having a first current calibration map. The computing device further comprises a second display device having a second capacitive touch sensor. The computing device further comprises a processor configured to perform a first run-time calibration on the first capacitive touch sensor to generate a first calculated calibration map. The processor is further configured to perform a second run-time calibration on the second capacitive touch sensor to generate a second calculated calibration map. The processor is further configured to detect a replacement condition for the first calculated calibration map and replace the first current calibration map with the second calculated calibration map, such that the second calculated calibration map is utilized for the first capacitive touch sensor of the first display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
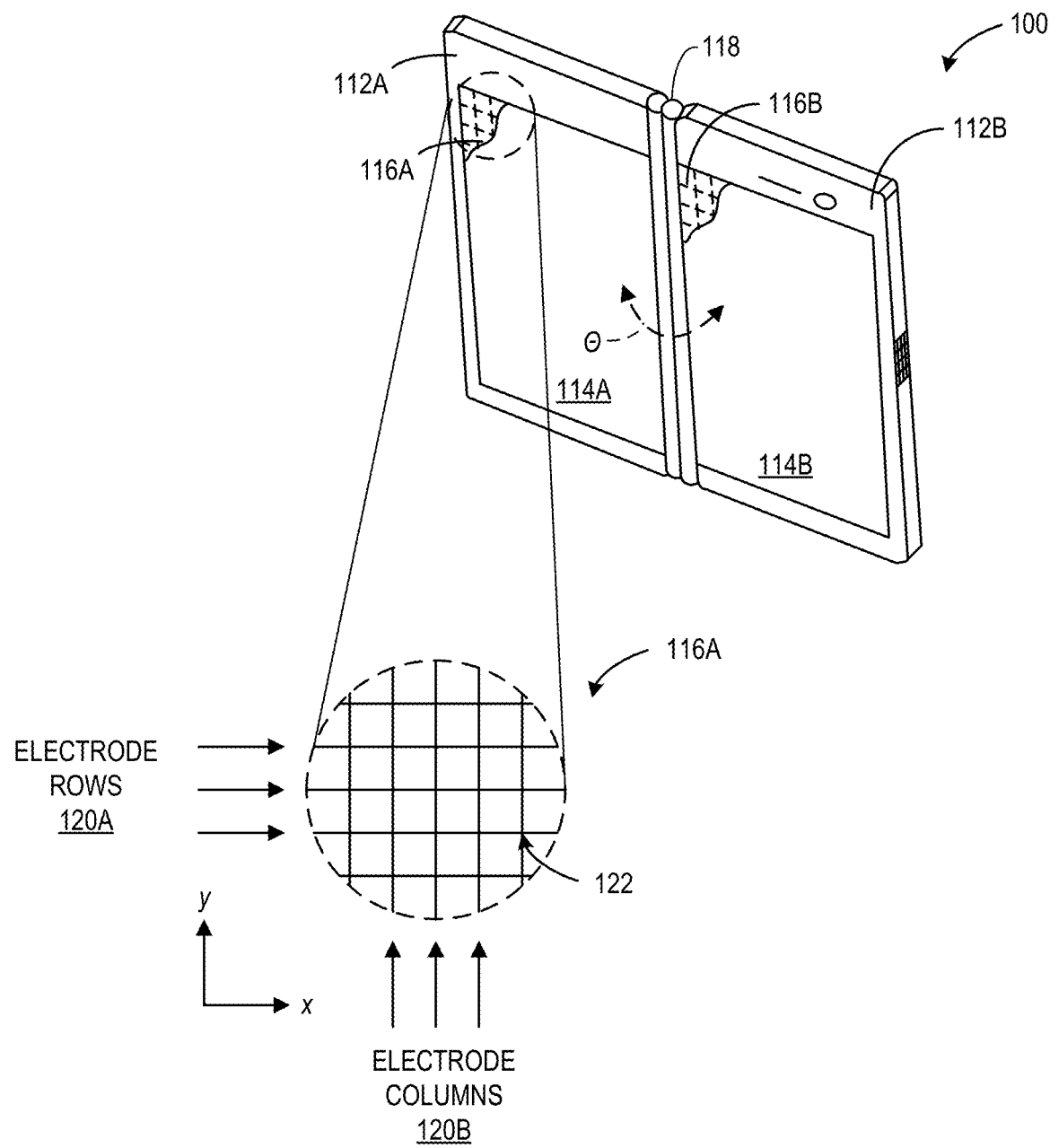
FIG. 1 shows a computing device with dual displays, according to one embodiment of the present disclosure.

As described above, technical challenges exist in performing valid run-time calibrations on touchscreens of dual touchscreen devices. For example, in many instances one or both of the run-time calibrations may be performed under conditions that render the run-time calibrations invalid, which can lead to inaccurate detection of touch inputs. To address these issues, as shown in FIG. 1, a computing device 100 in accordance with one example embodiment of the present invention is disclosed. The computing device 100 comprises a first display device 112A having a first display surface 114A, and a first capacitive touch sensor 116A. The computing device 100 further comprises a second display device 112B having a second display surface 114B and a second capacitive touch sensor 116B. The first and second display devices 112A, 112B are hinged together for relative rotational motion via a hinge 118, that may be positioned at various hinge angles θ. Hinge 118 is positioned between and coupled to each of the first display device 112A and the second display device 112B. The first display device 112A and the second display device 112B are rotatable about the hinge 118 and separated by the hinge angle. The hinge angle is defined as an angle between the first display surface 116A and the second display surface 116B. The hinge 118 is rotatable such that the hinge angle may have any value between 0° and 360°, in one example configuration.

The respective display surfaces 114A, 114B are configured to display images. Shown in a magnified view, is the first capacitive touch sensor 116A having electrodes arranged in rows 120A and columns 12B. At each intersection of the rows and columns is a junction 122, a point at which a capacitance measurement may be made. While the first and second capacitive touch sensors 116A, 116B are illustrated in a capacitive grid configuration, it will be appreciated that other types of capacitive touch sensors and configurations may also be used, such as, for example, a capacitive diamond configuration. The capacitive touch sensors are typically at least partially transparent, being manufactured, for example, of indium tin oxide (ITO). The first and second capacitive touch sensors 116A, 116B are configured to detect a touch input caused by a change in capacitance between driven electrodes and read electrodes in the grid resulting from objects on or near the display devices 112A, 112B, such as a user's finger, hand, stylus, etc.

Figure 2:
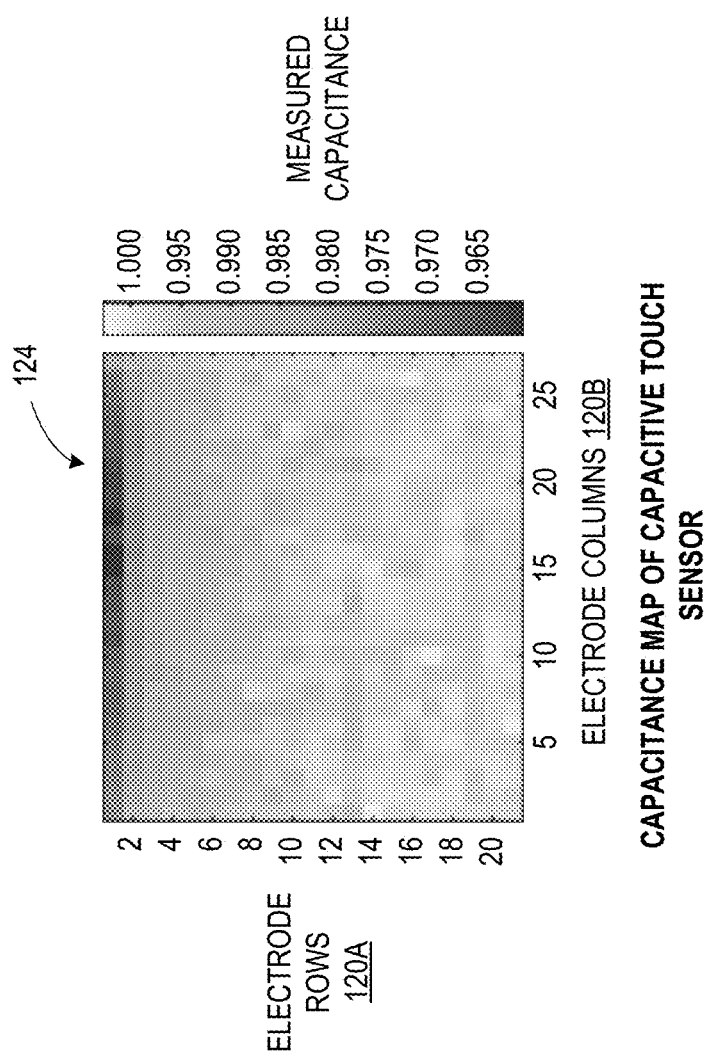
FIG. 2 is a capacitance map of a capacitive touch sensor of the computing device of FIG. 1.

Turning to FIG. 2, an example capacitance map 124 is provided for a capacitive touch sensor of the computing device 100. The capacitance map 124 shows measured capacitances of electrodes arranged in columns and rows. Capacitance maps 124 are discussed in more detail below in relation to FIG. 3.

Figure 3:
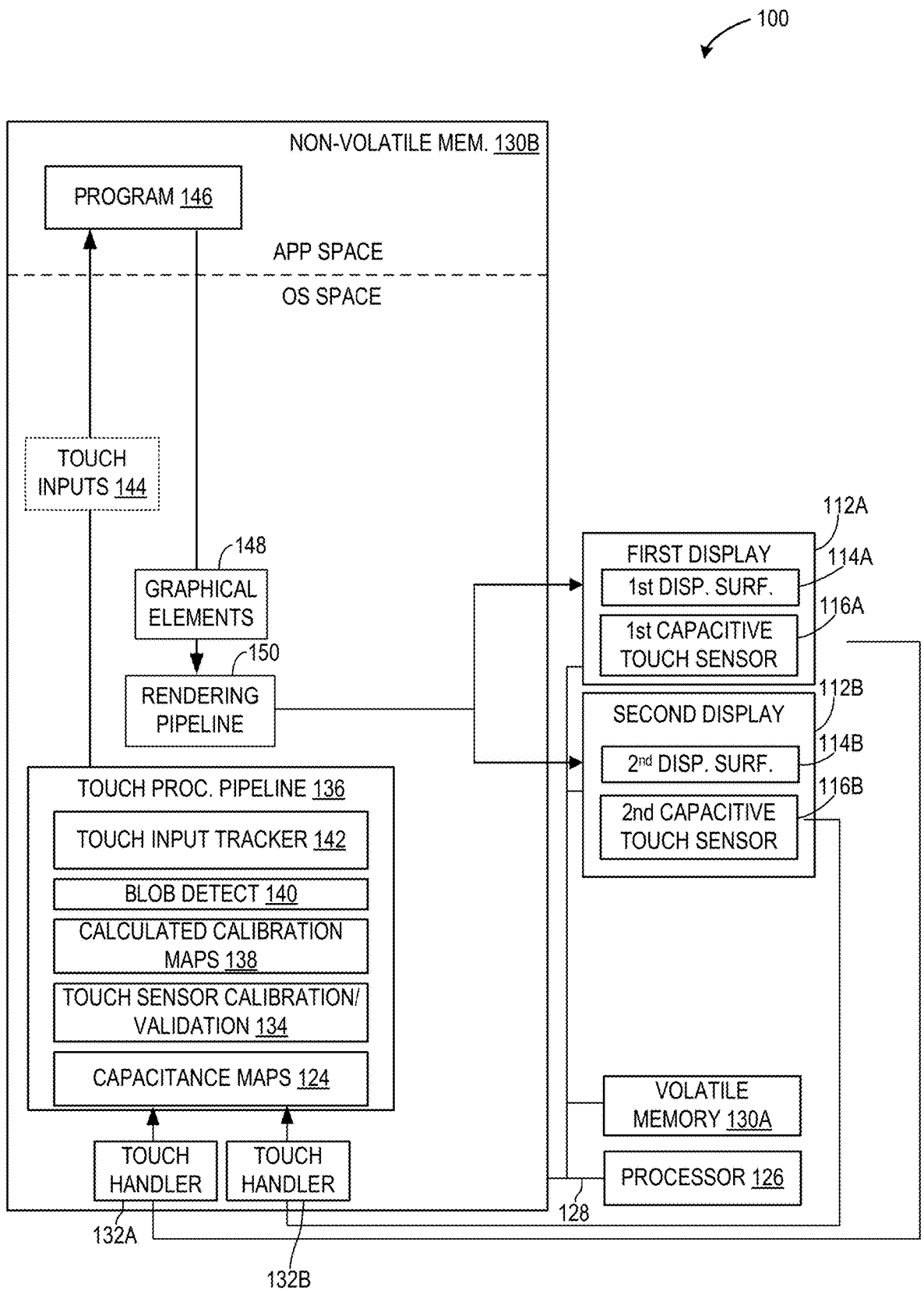
FIG. 3 is a schematic view illustrating software and hardware components of the computing device of FIG. 1.

Turning now to FIG. 3, a software and hardware architecture of the computing device 100 is illustrated in schematic view. Processor 126 is illustrated as being connected via a bus 128 to a volatile memory 130A, non-volatile memory 130B, first display device 112A, and second display device 112B. Programs stored in non-volatile memory 130B are executed by the processor 126 using portions of volatile memory 130A.

FIG. 3 generally illustrates a loop between detection of touch inputs and output of graphical elements for display. Beginning with the detection of touch inputs, during operation each of the first and second capacitive touch sensors 116A, 116B of the first and second display devices 112A, 112B are configured to continuously output their capacitances in the form of capacitance maps 124 to an associated touch handler 132A, 132B for each display 112A, 112B. The touch handlers 132A, 132B pass the capacitance maps 124 to a touch sensor calibration and validation module 134 of a touch processing pipeline 136, which performs on the fly, i.e., real-time, touch sensor calibration and validation to generate a first calculated calibration map 138A (corresponding to the first capacitive touch sensor 116A) and a second calculated calibration map 138B (corresponding to the second capacitive touch sensor 116B). The touch sensor calibration and validation module 134 will be discussed in more detail below with respect to FIGS. 4A-C.

Continuing with FIG. 3, the calculated calibration maps 138 are passed to a blob detection module 140, which determines the areas of the capacitive touch sensor 116A, 116B that are touched, after ignoring, i.e., rejecting, areas such as palms or forearms, which are not deemed part of the user's intended touch. The blob detection module 140 may be configured to detect and distinguish between touch and hover inputs. To achieve this, the blob detection module 140 may be configured to apply a first predetermined touch capacitance difference threshold to the calculated calibration map to discern where the display is being touched, and a second predetermined hover capacitance difference threshold, which is lower than the first predetermined touch capacitance difference threshold, to detect hover of a user's digit. In a typical application, a centroid of each blob detected by the blob detection module 140 is passed to a touch input tracker 142.

The touch input tracker 132 is configured to track various touches over time using tracking algorithms that take into account the size, position, and motion of each blob, and organize them into one or more touch inputs 144. Touch inputs 144 from the touch input tracker 142 are passed to a program 146 executed by processor 126. The program 146 may be an application program, an operating system component, utility or driver program, etc. The program 146 contains program logic that processes the touch inputs 144 and generates appropriate graphical elements 148 for display. The graphical elements 148 are sent from the program 144 to a rendering pipeline 150 of the operating system of the computing device 100. The rendering pipeline 150 prepares the graphical elements for display on one or both of the first and second display devices 112A, 112B.

In order for the above-described functions of the computing device 100 to be properly executed, it is beneficial to determine whether the first and second calculated calibration maps 138A, 138B are valid or invalid. An invalid calculated calibration map may result in the first and/or second capacitive touch sensors 116A, 116B detecting a touch input when no touch input is provided. Additionally or alternatively, a real touch input may go undetected. Invalid calculated calibration maps may be generated when the computing device 100 is subjected to adverse conditions including sudden temperature changes, high humidity or moisture, and/or aging of the computing deivce 100. A general strategy for preventing the invalid calculated calibration map from being utilized is to, for example utilize the first calculated calibration map 138A for the second capacitive touch sensor 116B, or vice versa.

Figure 4A:
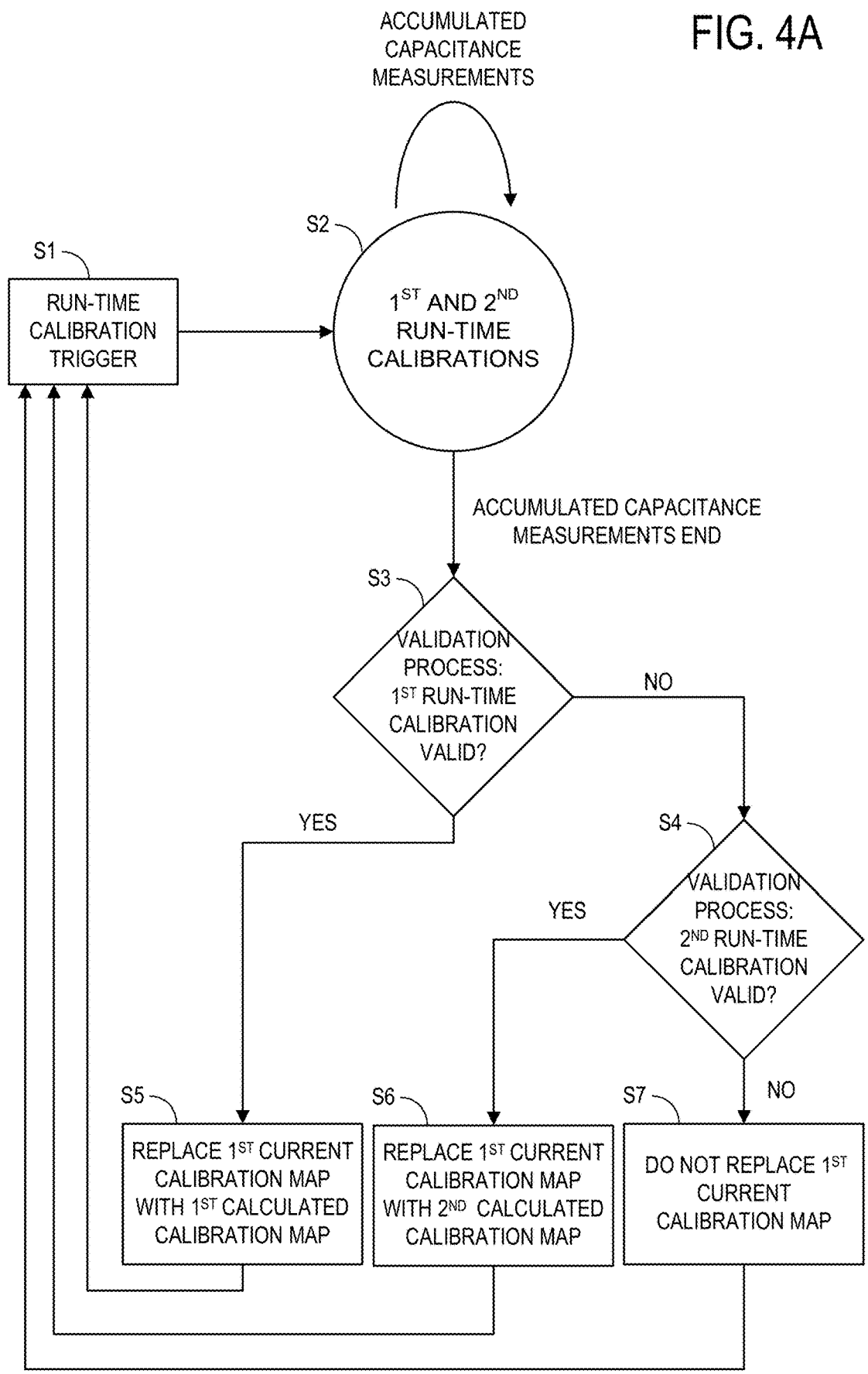
FIGS. 4A-4C show a flowchart for executing functions of the computing device of FIG. 1.
Figure 4B:
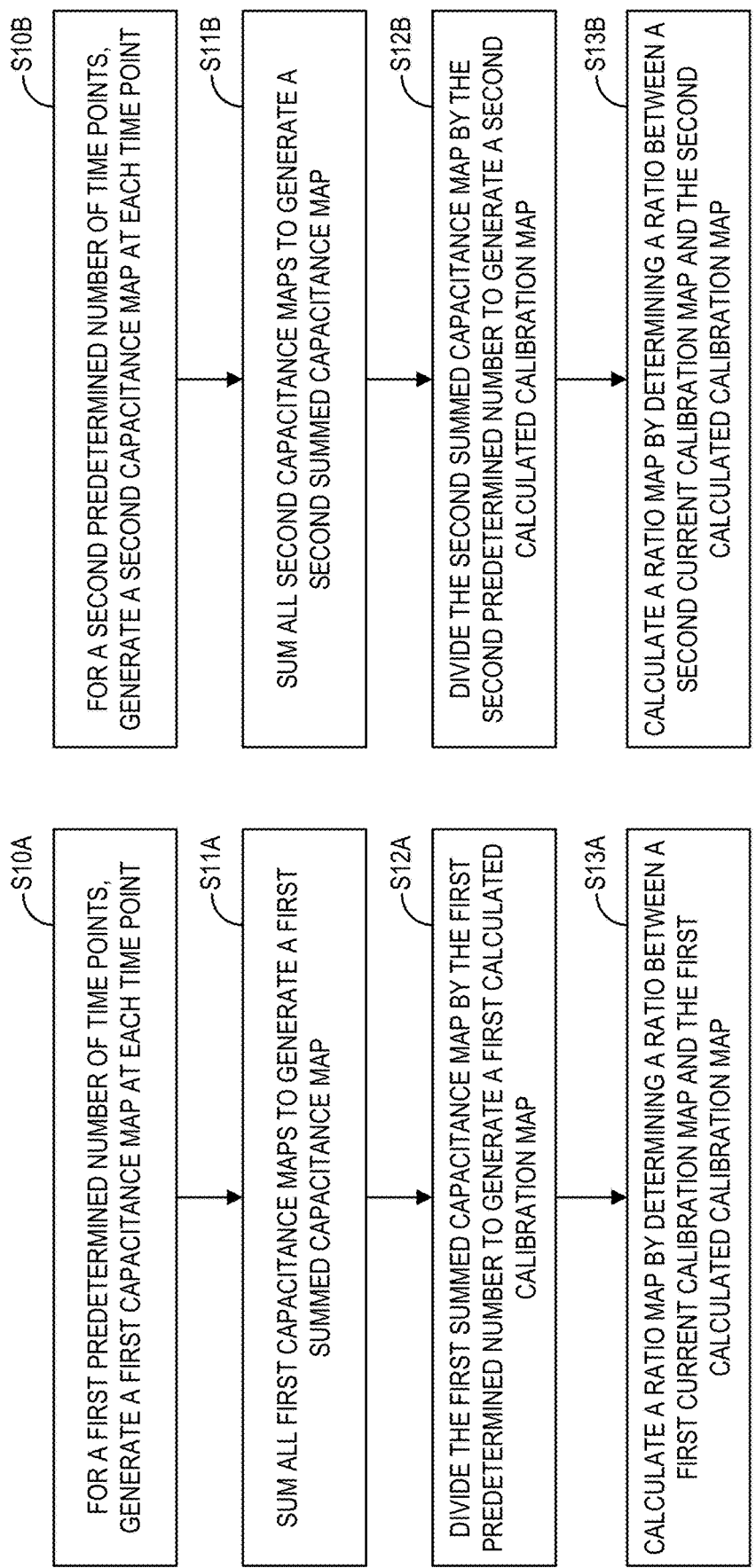
Figure 4C:
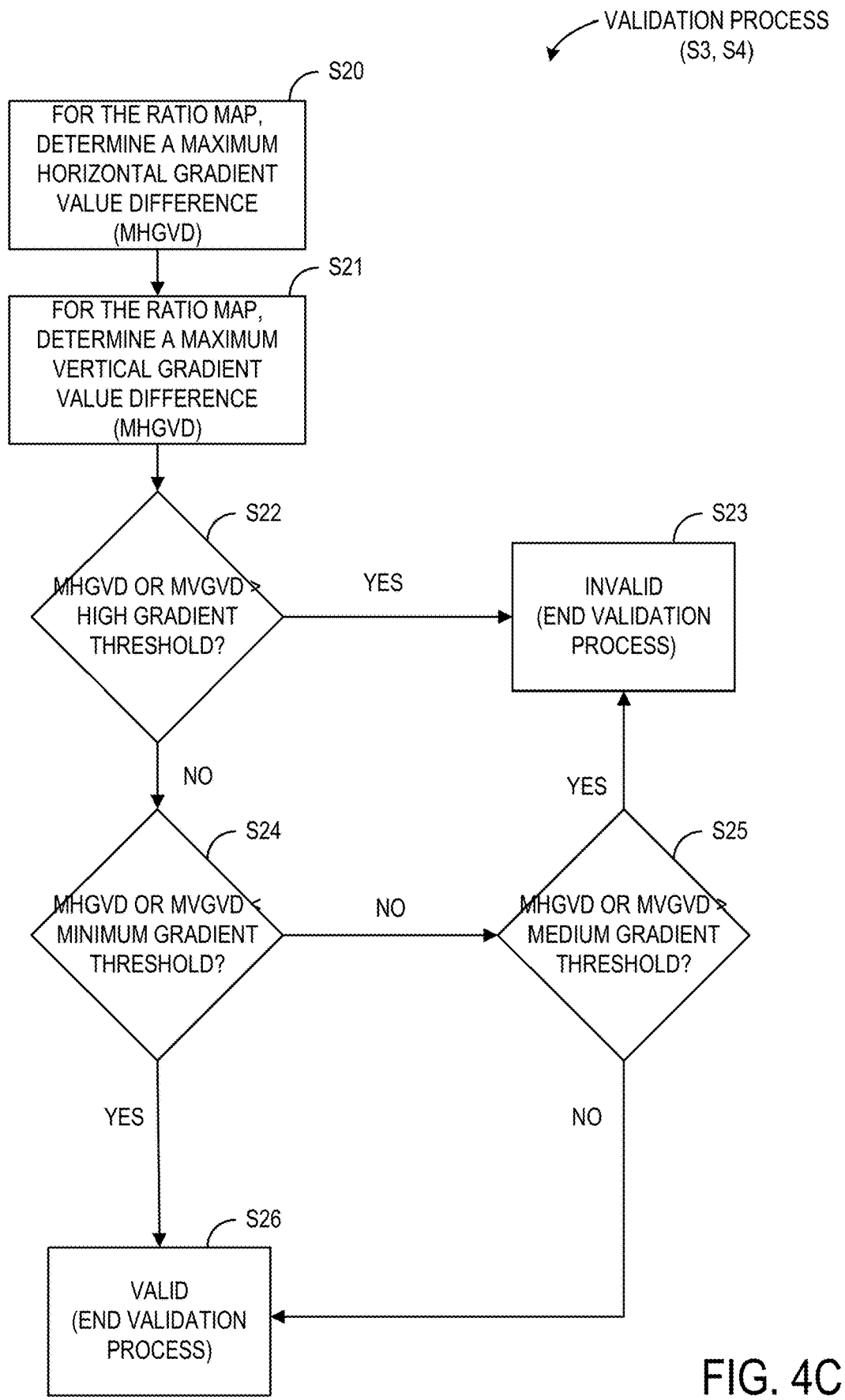

Functions performed by the touch sensor calibration and validation module 134 will now be described. FIGS. 4A-C are flowcharts showing a process by which the first or second calculated calibration maps 138A, 138B may be utilized for the first capacitive touch sensor 116A, depending on the validity of the calculated calibration maps 138A, 138B. While FIGS. 4A-C outline this process in the context of utilizing the first or second calculated calibration maps 138A, 138B for the first capacitive touch sensor 116A, it will be appreciated that the same process may be used to utilize the first or second calculated calibration maps 138A, 138B for the second capacitive touch sensor 116B.

FIG. 4A shows a run-time calibration trigger (S1) that causes a run-time calibration to begin is detected by the computing device 100. Examples of run-time calibration triggers include a bootup of the computing device 100, a software/firmware update, a passing of a predetermined period of time, a change in hinge angle of the computing device 100, a temperature change of the computing device 100, etc. The processor 126 is configured to perform a first run-time calibration on the first capacitive touch sensor 116A to generate the first calculated calibration map 138A, and perform the second run-time calibration on the second capacitive touch sensor 116B to generate the second calculated calibration map 138B (S2).

Details of the first and second calibrations are provided in FIG. 4B. For the first run-time calibration of the first capacitive touch sensor 116A, the processor 126 is configured to, for a first predetermined number of time points, generate a first capacitance map 124A for each of the time points (S10A). In this example, the predetermined number of time points is 32, and therefore 32 first capacitance maps 124A are generated. However, 4, 8, 16, 64, 128, or any other suitable number of first capacitance maps 124A may be used. The processor 126 is further configured to sum all the first capacitance maps 124A to generate a first summed capacitance map (S11A) and divide the first summed capacitance map by the first predetermined number (32 in this example) to generate the first calculated capacitance map 138A (S12A). Thus, the first calculated calibration map is an average capacitance map for a given number of capacitance measurements for each junction of the first capacitive touch sensor. A potential benefit of using the average capacitance map is that any noise that may be present in capacitance measurements of any single capacitance map may be reduced or eliminated. The processor is further configured to calculate a ratio map by determining a ratio between a first current calibration map and the first calculated calibration map 138A, the first current calibration map being a calibration map currently applied to the first capacitive touch sensor 116A (S13A). A potential benefit of determining the ratio map is that the ratio map provides a convenient way of comparing the first current calibration map and the first calculated calibration map. An analogous process is outlined (S10B-S13B) for the second capacitive touch sensor 116B. In this analogous process, a second current calibration map is used, the second current calibration map being a calibration map currently applied to the second capacitive touch sensor 116B. Both of the first and second current calibration maps may be stored in a memory 130 of the computing device 100.

Returning now to FIG. 4A, a validation process is performed on the first calculated calibration map 138A (S3). If the first calculated calibration map 138A is determined to be valid (YES at S3), the first current calibration map is replaced with the first calculated calibration map 138 (S5). If the first calculated calibration map 138A is determined to be invalid (NO at S3), the validation process is performed on the second calculated calibration map 138B (S4). If the second calculated calibration map 138B is determined to be valid (YES at S4), the first current calibration map is replaced with the second calculated calibration map 138B (S6). If the second calculated calibration map 138B is determined to be invalid (NO at S4), the first current calibration map is not replaced. After S5, S6, or S7 a subsequent run-time calibration trigger (S1) may restart the above-described process.

Using the process outlined in FIG. 4A, the processor 126 may detect a replacement condition for the first calculated calibration map 138A and replace the first current calibration map with the second calculated calibration map 138B, such that the second calculated calibration map 138B is utilized for the first capacitive touch sensor of the first display device. In this example, the replacement condition includes that the first calculated calibration map 138A is determined to be invalid. The replacement condition further includes that the second calculated calibration map 138B is determined to be valid according to the validation process.

While the above describes the first calculated calibration map 138A being replaced with the second calculated calibration map 138B, it will be appreciated that the computing device 100 may perform a complementary process. In this complementary process, the second capacitive touch sensor 116B has the second current calibration map, and the processor is further configured to detect a replacement condition for the second calculated calibration map, and replace the second current calibration map with the first calculated calibration map 138A, such that the first calculated calibration map 138A is utilized for the second capacitive touch sensor 116B of the second display device 112B.

Continuing to FIG. 4C, a flowchart for the validation process is shown. While the validation process will be described in the context of the first calculated calibration map 138A, it will be appreciated that the validation process may be applied to any calculated calibration map such as the second calculated calibration map 138B. In the above example in which the first calculated calibration map 138A is determined to be invalid, the validation process for determining that the first calculated calibration map is invalid includes, for the ratio map, determining a maximum horizontal gradient value difference (MHGVD) among the sets of neighboring junctions 122 in the first capacitive touch sensor 116A for each electrode row 120A of the first capacitive touch sensor 116A (S20). In other words, for each electrode row 120A of the ratio map, a value difference between each set of neighboring junctions 122 in each electrode row 120A is determined, and the highest value difference from among all electrode rows 120A is the MHGVD.

Similarly, the validation process further includes, for the ratio map, determining a maximum vertical gradient value difference (MVGVD) among the sets of neighboring junctions 122 in the first capacitive touch sensor 116A for each electrode column 120B of the first capacitive touch sensor 116A (S21). In other words, for each electrode column 120B of the ratio map, a value difference between each set of neighboring junctions 122 in each electrode column 120B is determined, and the highest value difference from among all electrode columns 120B is the MVGVD.

By determining the MHGVD and MVGVD as described above, it is possible to perform subsequent steps of the validation process using only these two values from among potentially thousands of values included in the ratio map, thereby reducing the computational cost of the validation process. Along with the MHGVD and MVGVD, the validation process further includes using a high gradient threshold, which is larger than a medium gradient threshold, which is larger than a minimum gradient threshold. These thresholds are values that are compared to the MHGVD and MVGVD in order to determine that a given calculated calibration map is valid. For example, the validation process further includes, in a case that at least one of the maximum horizontal gradient value difference and the maximum vertical gradient value difference are above the high gradient threshold (YES at S22), determining that the calculated calibration map is invalid, and the validation process ends (S23).

Alternatively (NO at S22), the validation process further includes, in a case that at least one of the maximum horizontal gradient value difference and the maximum vertical gradient value difference are below a minimum gradient threshold (YES at S24), determining that the calculated calibration map is valid, and the validation process ends (S26).

Alternatively (NO at S24), the validation process further includes, in a case that at least one of the maximum horizontal gradient value difference and the maximum vertical gradient value difference are above the medium gradient threshold (YES at S25), determining that the calculated calibration map is invalid, and the validation process ends (S23).

Figure 5:
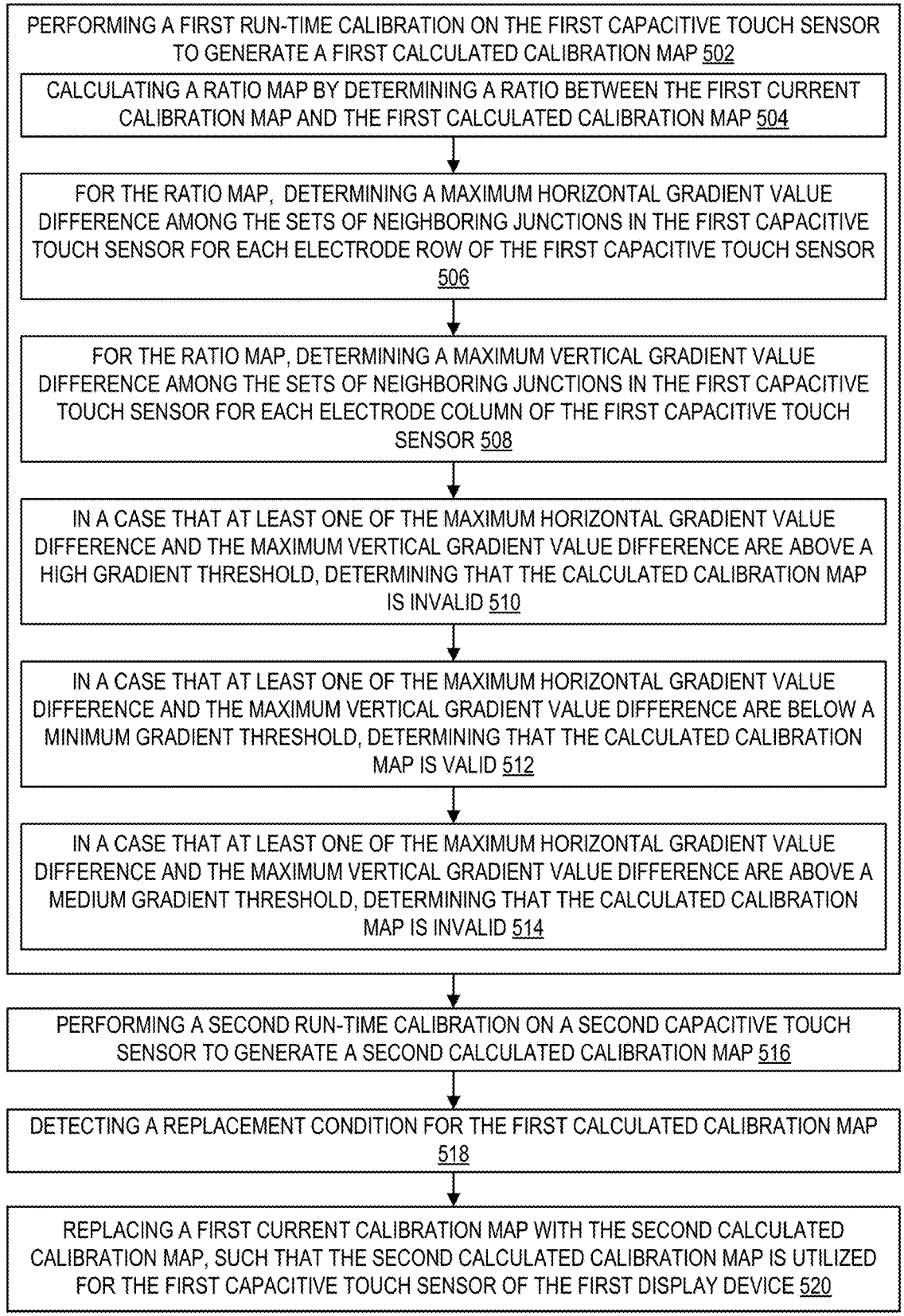
FIG. 5 shows a flowchart for a method according to one embodiment of the present disclosure.

With reference now to FIG. 5, a flow diagram is illustrated depicting an example method 500 for calibrating a first capacitive touch sensor of a first display device of a computing device having a second display device including a second capacitive touch sensor. The following description of method 500 is provided with reference to the software and hardware components described herein and shown in FIGS. 1 and 3. For example, the method 500 may be performed by the computing device 100, hardware, software, and/or firmware of the computing device 100, or a suitable combination of components described herein.

It will be appreciated that following description of method 500 is provided by way of example and is not meant to be limiting. Therefore, it is to be understood that method 500 may include additional and/or alternative steps relative to those illustrated in FIG. 5. Further, it is to be understood that the steps of method 500 may be performed in any suitable order. Further still, it is to be understood that one or more steps may be omitted from method 500 without departing from the scope of this disclosure. It will also be appreciated that method 500 also may be performed in other contexts using other suitable components.

Turning now to FIG. 5, the method 500 comprises at 502 performing a first run-time calibration on the first capacitive touch sensor to generate a first calculated calibration map. At 504, the method 500 further comprises, in the first run-time calibration, calculating a ratio map by determining a ratio between the first current calibration map and the first calculated calibration map, the first current calibration map being a calibration map currently applied to the first capacitive touch sensor. The first calculated calibration map is an average capacitance map for a given number of capacitance measurements for each junction of the first capacitive touch sensor. At 506, the method 500 further comprises for the ratio map, determining a maximum horizontal gradient value difference among the sets of neighboring junctions in the first capacitive touch sensor for each electrode row of the first capacitive touch sensor. At 508, the method 500 further comprises for the ratio map, determining a maximum vertical gradient value difference among the sets of neighboring junctions in the first capacitive touch sensor for each electrode column of the first capacitive touch sensor. At 510, the method 500 further comprises in a case that at least one of the maximum horizontal gradient value difference and the maximum vertical gradient value difference are above a high gradient threshold, determining that the calculated calibration map is invalid. At 512, the method 500 further comprises in a case that at least one of the maximum horizontal gradient value difference and the maximum vertical gradient value difference are below a minimum gradient threshold, determining that the calculated calibration map is valid. At 514, the method 500 further comprises in a case that at least one of the maximum horizontal gradient value difference and the maximum vertical gradient value difference are above a medium gradient threshold, determining that the calculated calibration map is invalid. At 516, the method 500 further comprises performing a second run-time calibration on a second capacitive touch sensor to generate a second calculated calibration map. At 518, the method 500 further comprises detecting a replacement condition for the first calculated calibration map. The replacement condition includes that the first calculated calibration map is determined to be invalid. At 520, the method 500 further comprises replacing a first current calibration map with the second calculated calibration map, such that the second calculated calibration map is utilized for the first capacitive touch sensor of the first display device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
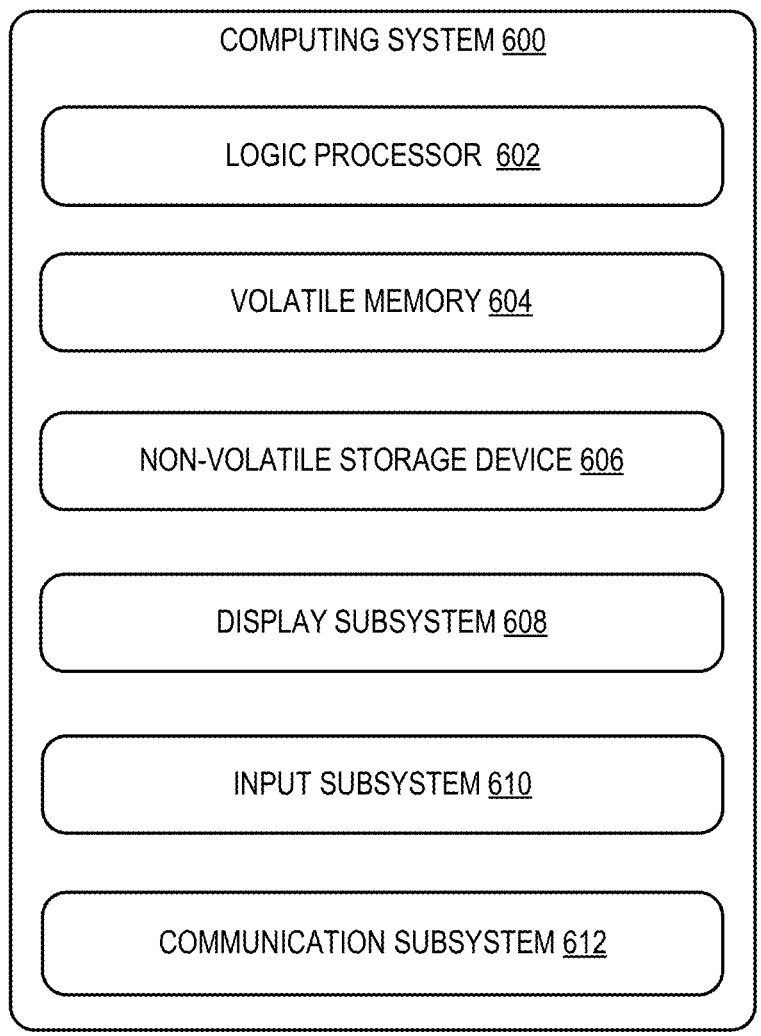
FIG. 6 shows an example computing system according to an embodiment of the present disclosure.

FIG. 6 schematically shows a non-limiting embodiment of a computing system 600 that can enact one or more of the methods and processes described above. Computing system 600 is shown in simplified form. Computing system 600 may embody the computer device 100 described above and illustrated in FIG. 1. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 6.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional description of the subject matter of the present disclosure. According to one aspect, a computing device is provided that comprises a first display device having a first capacitive touch sensor having a first current calibration map, a second display device having a second capacitive touch sensor, and a processor. The processor is configured to perform a first run-time calibration on the first capacitive touch sensor to generate a first calculated calibration map, perform a second run-time calibration on the second capacitive touch sensor to generate a second calculated calibration map, detect a replacement condition for the first calculated calibration map, and replace the first current calibration map with the second calculated calibration map, such that the second calculated calibration map is utilized for the first capacitive touch sensor of the first display device.

In this aspect, the second capacitive touch sensor may have a second current calibration map. The processor may be further configured to detect a replacement condition for the second calculated calibration map and replace the second current calibration map with the first calculated calibration map, such that the first calculated calibration map is utilized for the second capacitive touch sensor of the second display device.

In this aspect, the first and second current calibration maps may be stored in a memory of the computing device.

In this aspect, performing the first run-time calibration may include calculating a ratio map by determining a ratio between the first current calibration map and the first calculated calibration map, the first current calibration map being a calibration map currently applied to the first capacitive touch sensor.

In this aspect, the first calculated calibration map may be an average capacitance map for a given number of capacitance measurements for each junction of the first capacitive touch sensor.

In this aspect, the replacement condition may include that the first calculated calibration map is determined to be invalid.

In this aspect, a validation process for determining that the first calculated calibration map is invalid may include, for the ratio map, determining a maximum horizontal gradient value difference among the sets of neighboring junctions in the first capacitive touch sensor for each electrode row of the first capacitive touch sensor, and determining a maximum vertical gradient value difference among the sets of neighboring junctions in the first capacitive touch sensor for each electrode column of the first capacitive touch sensor.

In this aspect, the validation process may further include, in a case that at least one of the maximum horizontal gradient value difference and the maximum vertical gradient value difference are above a high gradient threshold, determining that the calculated calibration map is invalid.

In this aspect, the validation process may further include, in a case that at least one of the maximum horizontal gradient value difference and the maximum vertical gradient value difference are below a minimum gradient threshold, determining that the calculated calibration map is valid.

In this aspect, the validation process may further include, in a case that at least one of the maximum horizontal gradient value difference and the maximum vertical gradient value difference are above a medium gradient threshold, determining that the calculated calibration map is invalid.

In this aspect the replacement condition may further include that the second calculated calibration map is determined to be valid according to the validation process.

According to another aspect, a method for calibrating a first capacitive touch sensor of a first display device is provided. The method comprises performing a first run-time calibration on the first capacitive touch sensor to generate a first calculated calibration map, performing a second run-time calibration on a second capacitive touch sensor to generate a second calculated calibration map, detecting a replacement condition for the first calculated calibration map, and replacing a first current calibration map with the second calculated calibration map, such that the second calculated calibration map is utilized for the first capacitive touch sensor of the first display device.

In this aspect, performing the first run-time calibration may include calculating a ratio map by determining a ratio between the first current calibration map and the first calculated calibration map, the first current calibration map being a calibration map currently applied to the first capacitive touch sensor.

In this aspect, the first calculated calibration map may be an average capacitance map for a given number of capacitance measurements for each junction of the first capacitive touch sensor.

In this aspect, the replacement condition may include that the first calculated calibration map is determined to be invalid.

In this aspect, a validation process for determining that the first calculated calibration map is invalid may include, for the ratio map, determining a maximum horizontal gradient value difference among the sets of neighboring junctions in the first capacitive touch sensor for each electrode row of the first capacitive touch sensor, and determining a maximum vertical gradient value difference among the sets of neighboring junctions in the first capacitive touch sensor for each electrode column of the first capacitive touch sensor.

In this aspect, the validation process may further include, in a case that at least one of the maximum horizontal gradient value difference and the maximum vertical gradient value difference are above a high gradient threshold, determining that the calculated calibration map is invalid.

In this aspect, the validation process may further include, in a case that at least one of the maximum horizontal gradient value difference and the maximum vertical gradient value difference are below a minimum gradient threshold, determining that the calculated calibration map is valid.

In this aspect, the validation process may further include, in a case that at least one of the maximum horizontal gradient value difference and the maximum vertical gradient value difference are above a medium gradient threshold, determining that the calculated calibration map is invalid.

According to another aspect, a computing device is provided comprising a first display device having a first capacitive touch sensor having a first current calibration map, a second display device having a second capacitive touch sensor, a hinge positioned between and coupled to each of the first display device and the second display device, the first display device and second display device being rotatable about the hinge and separated by a hinge angle, and a processor. The processor is configured to perform a first run-time calibration on the first capacitive touch sensor to generate a first calculated calibration map, perform a second run-time calibration on the second capacitive touch sensor to generate a second calculated calibration map, detect a replacement condition for the first calculated calibration map, and replace the first current calibration map with the second calculated calibration map, such that the second calculated calibration map is utilized for the first capacitive touch sensor of the first display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a first display device having a first capacitive touch sensor having a first current calibration map;
a second display device having a second capacitive touch sensor; and
a processor configured to:
perform a first run-time calibration on the first capacitive touch sensor to generate a first calculated calibration map;
perform a second run-time calibration on the second capacitive touch sensor to generate a second calculated calibration map;
detect a replacement condition for the first calculated calibration map; and
replace the first current calibration map with the second calculated calibration map, such that the second calculated calibration map is utilized for the first capacitive touch sensor of the first display device.

2. The computing device of claim 1, wherein
the second capacitive touch sensor has a second current calibration map; and
the processor is further configured to:
detect a replacement condition for the second calculated calibration map; and
replace the second current calibration map with the first calculated calibration map, such that the first calculated calibration map is utilized for the second capacitive touch sensor of the second display device.

3. The computing device of claim 2, wherein the first and second current calibration maps are stored in a memory of the computing device.

4. The computing device of claim 1, wherein performing the first run-time calibration includes:
calculating a ratio map by determining a ratio between the first current calibration map and the first calculated calibration map, the first current calibration map being a calibration map currently applied to the first capacitive touch sensor.

5. The computing device of claim 4, wherein
the first calculated calibration map is an average capacitance map for a given number of capacitance measurements for each junction of the first capacitive touch sensor.

6. The computing device of claim 5, wherein
the replacement condition includes that the first calculated calibration map is determined to be invalid.

7. The computing device of claim 6, wherein a validation process for determining that the first calculated calibration map is invalid includes:
for the ratio map,
determining a maximum horizontal gradient value difference among the sets of neighboring junctions in the first capacitive touch sensor for each electrode row of the first capacitive touch sensor; and
determining a maximum vertical gradient value difference among the sets of neighboring junctions in the first capacitive touch sensor for each electrode column of the first capacitive touch sensor.

8. The computing device of claim 7, wherein the validation process further includes:
in a case that at least one of the maximum horizontal gradient value difference and the maximum vertical gradient value difference are above a high gradient threshold, determining that the calculated calibration map is invalid.

9. The computing device of claim 7, wherein the validation process further includes:
in a case that at least one of the maximum horizontal gradient value difference and the maximum vertical gradient value difference are below a minimum gradient threshold, determining that the calculated calibration map is valid.

10. The computing device of claim 7, wherein the validation process further includes:
in a case that at least one of the maximum horizontal gradient value difference and the maximum vertical gradient value difference are above a medium gradient threshold, determining that the calculated calibration map is invalid.

11. The computing device of claim 10, wherein
the replacement condition further includes that the second calculated calibration map is determined to be valid according to the validation process.

12. A method for calibrating a first capacitive touch sensor of a first display device, the method comprising:
performing a first run-time calibration on the first capacitive touch sensor to generate a first calculated calibration map;
performing a second run-time calibration on a second capacitive touch sensor to generate a second calculated calibration map;
detecting a replacement condition for the first calculated calibration map; and
replacing a first current calibration map with the second calculated calibration map, such that the second calculated calibration map is utilized for the first capacitive touch sensor of the first display device.

13. The method of claim 12, wherein performing the first run-time calibration includes:
calculating a ratio map by determining a ratio between the first current calibration map and the first calculated calibration map, the first current calibration map being a calibration map currently applied to the first capacitive touch sensor.

14. The method of claim 13, wherein
the first calculated calibration map is an average capacitance map for a given number of capacitance measurements for each junction of the first capacitive touch sensor.

15. The method of claim 14, wherein
the replacement condition includes that the first calculated calibration map is determined to be invalid.

16. The method of claim 15, wherein a validation process for determining that the first calculated calibration map is invalid includes:
for the ratio map,
determining a maximum horizontal gradient value difference among the sets of neighboring junctions in the first capacitive touch sensor for each electrode row of the first capacitive touch sensor; and
determining a maximum vertical gradient value difference among the sets of neighboring junctions in the first capacitive touch sensor for each electrode column of the first capacitive touch sensor.

17. The method of claim 16, wherein the validation process further includes:
in a case that at least one of the maximum horizontal gradient value difference and the maximum vertical gradient value difference are above a high gradient threshold, determining that the calculated calibration map is invalid.

18. The method of claim 16, wherein the validation process further includes:

in a case that at least one of the maximum horizontal gradient value difference and the maximum vertical gradient value difference are below a minimum gradient threshold, determining that the calculated calibration map is valid.

19. The method of claim 16, wherein the validation process further includes:
in a case that at least one of the maximum horizontal gradient value difference and the maximum vertical gradient value difference are above a medium gradient threshold, determining that the calculated calibration map is invalid.

20. A computing device comprising:
a first display device having a first capacitive touch sensor having a first current calibration map;
a second display device having a second capacitive touch sensor;
a hinge positioned between and coupled to each of the first display device and the second display device, the first display device and second display device being rotatable about the hinge and separated by a hinge angle; and
a processor configured to:
perform a first run-time calibration on the first capacitive touch sensor to generate a first calculated calibration map;
perform a second run-time calibration on the second capacitive touch sensor to generate a second calculated calibration map;
detect a replacement condition for the first calculated calibration map; and
replace the first current calibration map with the second calculated calibration map, such that the second calculated calibration map is utilized for the first capacitive touch sensor of the first display device.

* * * * *